United States Patent [19]

Uranishi et al.

[11] Patent Number: 4,657,156
[45] Date of Patent: Apr. 14, 1987

[54] FUEL TANK FOR USE IN A MOTOR VEHICLE

[75] Inventors: Koji Uranishi, Susono; Takaaki Ito, Mishima; Toshio Tanahashi, Susono, all of Japan

[73] Assignee: Toyota Jidosha Kabushiki Kaisha, Aichi, Japan

[21] Appl. No.: 715,172

[22] Filed: Mar. 22, 1985

[30] Foreign Application Priority Data

Mar. 23, 1984 [JP] Japan .................................. 59-54440
Mar. 23, 1984 [JP] Japan .................................. 59-54442

[51] Int. Cl.⁴ ............................................ B65D 25/00
[52] U.S. Cl. ................................ 220/85 VS; 137/582; 137/587; 137/590; 220/86 R
[58] Field of Search ............ 220/85 VR, 85 VS, 85 S, 220/86 R; 137/582, 587, 592, 546, 550, 593, 590; 55/387; 210/532.1, 533

[56] References Cited

U.S. PATENT DOCUMENTS

| | | | |
|---|---|---|---|
| 1,343,812 | 6/1920 | Dickerson | 137/582 |
| 2,002,407 | 5/1935 | Lemke | 210/533 |
| 2,601,894 | 7/1952 | Morse | 137/582 |
| 3,151,768 | 10/1964 | Buchner et al. | 220/86 R |
| 3,396,875 | 8/1968 | Finch | 220/86 R X |
| 3,478,922 | 11/1969 | Mole | |
| 3,603,345 | 9/1971 | Vevwys | 137/582 |
| 3,682,197 | 8/1972 | Snyder | 220/86 R X |
| 3,722,529 | 3/1972 | Arakawa | 137/546 X |
| 3,748,829 | 7/1972 | Joyce et al. | |
| 3,905,505 | 9/1975 | Gallay | 220/86 R X |
| 3,907,153 | 9/1975 | Mutty | 220/86 R |
| 3,917,109 | 11/1975 | MacDonald | 220/85 VS |
| 3,949,720 | 4/1976 | Zipprich et al. | 220/85 B X |
| 4,135,562 | 1/1979 | Martineau | 220/86 R X |
| 4,531,653 | 7/1985 | Sakata | 220/85 VS |
| 4,572,394 | 2/1986 | Tanahashi et al. | 220/86 R |

FOREIGN PATENT DOCUMENTS 52-158214 12/1977 Japan .
56-128221 10/1981 Japan .

Primary Examiner—Allan N. Shoap
Attorney, Agent, or Firm—Finnegan, Henderson, Farabow, Garrett & Dunner

[57] ABSTRACT

A fuel tank comprising a fuel inlet pipe and a cap detachably attached to the fuel inlet of the fuel inlet pipe. The fuel tank has a small chamber expanding downward from the bottom wall of the fuel tank. The fuel outlet of the fuel inlet pipe is open to the small chamber. A baffle member made of a porous material is fixed to the inner bottom wall of the small chamber.

6 Claims, 6 Drawing Figures

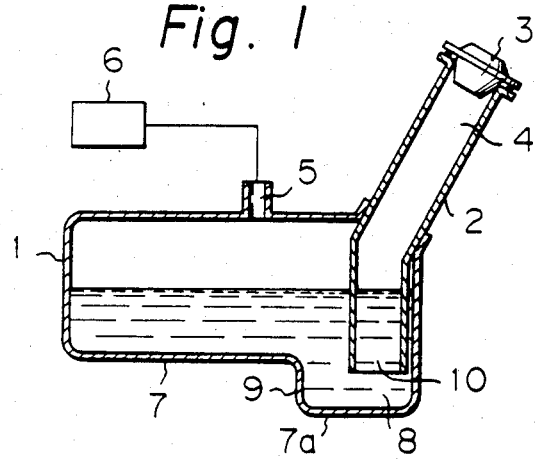
Fig. 1
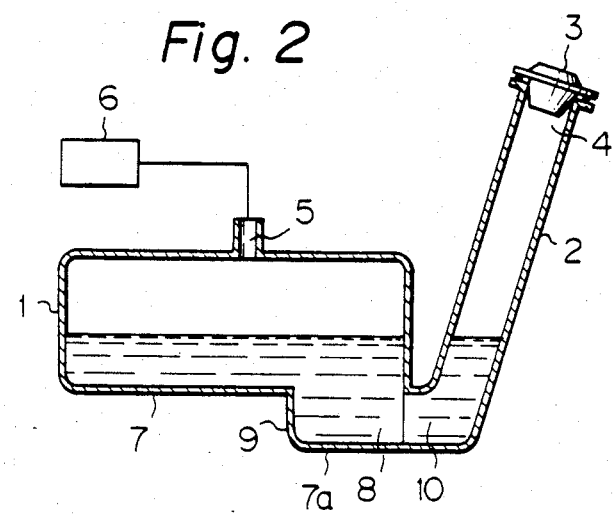
Fig. 2
Fig. 3
Fig. 4
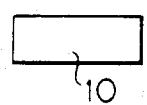

FUEL TANK FOR USE IN A MOTOR VEHICLE

BACKGROUND OF THE INVENTION

1. Field of the Invention

The present invention relates to a fuel tank for use in a motor vehicle.

2. Description of the Related Art

A motor vehicle driven by an internal combustion engine is normally equipped with a fuel tank. When it becomes necessary to replenish the fuel tank with fuel, the cap attached to the fuel inlet of the fuel tank must first be detached, to allow the insertion of a fuel pump nozzle. After the fuel pump nozzle is inserted into the fuel inlet of the fuel tank, fuel is fed into the fuel in the fuel tank from the fuel pump nozzle. However, when the level of the fuel in the fuel tank is low, the space in the fuel tank above the surface of the liquid fuel is filled with a large amount of fuel vapor under pressure. Consequently, when the cap is detached from the fuel inlet of the fuel tank, the fuel vapor in the fuel tank is forced out of the fuel tank into the outside air, causing air pollution. In addition, when fuel is fed into the fuel tank from the fuel pump nozzle, the fuel spouted from the nozzle comes into violent contact with and agitates the fuel in the fuel tank, causing bubbles to form in the fuel in the fuel tank. The collapsing of these bubbles causes further amounts of fuel vapor to be generated in the fuel tank, and this fuel vapor escapes from the fuel inlet of the fuel tank, causing more air pollution.

Japanese Unexamined Patent Publication (Kokai) No. 56-128221 discloses a fuel tank in which a fuel storing chamber completely surrounded by an expansible bellows is formed on the inner bottom wall of the fuel tank, and the fuel inlet pipe is connected to the fuel storing chamber. In this embodiment, it is possible to reduce the amount of fuel vapor escaping to the outside air when the cap is detached from the fuel inlet of the fuel inlet pipe. However, in this embodiment, it is impossible to discharge the fuel vapor stored in the bellows to the exterior of the bellows, and thus there is a problem in that a satisfactory large storing volume for fuel can not be obtained in the tank.

SUMMARY OF THE INVENTION

An object of the present invention is to provide a fuel tank having a satisfactory large volume for storing fuel and capable of alleviating air pollution caused by the fuel vapor in the tank by preventing as much of the fuel vapor in the fuel tank as possible from escaping to the outside air when the fuel filling operation is carried out.

Additional objects and advantages of the present invention will be set forth in part in the description that follows and in part will be obvious from the description or may be learned by practice of the invention. The objects and advantages of the invention may be realized and obtained by the apparatus particularly pointed out in the appended claims.

Thus, according to the present invention, there is provided a fuel tank for use in a motor vehicle, comprising a small chamber expanding downward from a bottom wall of the fuel tank; a fuel inlet pipe having a fuel inlet and a fuel outlet which is open to the small chamber; a cap detachably attached to the fuel inlet; and a canister having an activated carbon contained therein and connected to an upper interior of the fuel tank.

The present invention may be more fully understood from the description of preferred embodiments of the invention set forth below, together with the accompanying drawings. The accompanying drawings, which are incorporated in and constitute a part of this specification, illustrate the presently preferred embodiments of the invention and, together with the description, serve to explain the principles of the invention.

BRIEF DESCRIPTION OF THE DRAWINGS

In the drawings:

FIG. 1 is a cross-sectional side view of a first embodiment of a fuel tank according to the present invention;

FIG. 2 is a cross-sectional side view of a second embodiment of a fuel tank according to the present invention;

FIG. 3 is a front view of another embodiment of the fuel outlet of the fuel inlet pipe according to the present invention;

FIG. 4 is a front view of a further embodiment of the fuel outlet of the fuel inlet pipe according to the present invention;

FIG. 4 is a cross-sectional side view of a third embodiment of a fuel tank according to the present invention; and, FIG. 6 is a cross-sectional side view of a fourth embodiment of a fuel tank according to the present invention.

DESCRIPTION OF THE PREFERRED EMBODIMENTS

Figure 5:
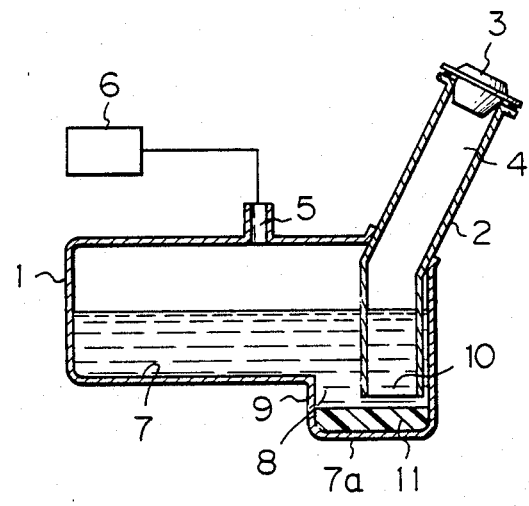

Reference will now be made in detail to presently preferred embodiments of the invention, examples of which are illustrated in the accompanying drawings. Throughout the drawings, like reference characters are used to designate like elements.

A first embodiment of the present invention is illustrated in FIG. 1. A fuel tank 1, having a fuel inlet pipe 2 with a cap 3 detachably attached to an inlet 4 of the fuel inlet pipe 2 and with a fuel vapor outlet 5 is shown. A canister 6 containing charcoal is positioned outside of the tank. The fuel vapor oulet 5 is connected to the canister 6, and the fuel vapor located in the upper space of the fuel tank 1 is continuously fed into the canister 6. The fuel vapor fed into the canister 6 is abosrbed by the activated carbon in the canister 6, and the fuel vapor absorbed by the activated carbon is drawn into the intake manifold (not shown) via the fuel vapor conduit (not shown) at a predetermined engine operating state.

As illustrated in FIG. 1, the fuel tank 1 has a flat bottom wall 7. A portion 7a of the flat bottom wall 7 is expanded downward, and a small chamber 8 surrounded by the vertical wall 9 of the fuel tank 1 is formed above the expanded portion 7a. The fuel inlet pipe 2 extends downward in the fuel tank 1 to the interior of the small chamber 8, and the fuel outlet 10 of the fuel inlet pipe 2 is open to the interior of the small chamber 8.

FIG. 2 illustrates a second embodiment of the present invention. In this embodiment, the entire fuel inlet pipe 2 is arranged at the exterior of the fuel tank 1, and the fuel outlet 10 of the fuel inlet pipe 2 is formed in the side wall of the fuel tank 1 and is open to the small chamber 8. It is preferable that the inner bottom wall of the fuel outlet 10 and the inner bottom wall of the small chamber 8 be located on the same plane. In the embodiment illustrated in FIG. 2, the fuel outlet 10 has a circular cross section. However, the fuel outlet 10 may be formed so that it has an ellipsoidal cross section or a rectangular cross section, as illustrated in FIGS. 3 and 4, respectively.

In the embodiments illustrated in FIGS. 1 and 2, the fuel inlet pipe 2 is connected to the interior of the small chamber 8. Consequently, when the amount of fuel in the fuel tank 1 becomes small, and the cap 3 is detached from the fuel inlet 4 in order to carry out the fuel filling operation, the fuel vapor in the fuel tank 1 does not escape to the outside air and only a small amount of the fuel vapor in the fuel inlet pipe 2 escapes to the outside air. Then, the fuel is fed from the fuel pump nozzle (not shown) into the small chamber 8. At this time, if the small chamber 8 is filled with fuel, the fuel fed from the fuel pump nozzle (not shown) comes into violent contact with the fuel located in the fuel inlet pipe 2. Consequently, at this time, only the fuel located in the fuel inlet pipe 2 forms bubbles and vaporizes, and thus the amount of the fuel vapor generated by bubbling is small. Where the fuel remains only in the bottom portion of the small chamber 8, the entire amount of fuel in the small chamber 8 bubbles and vaporizes when the fuel is fed from the fuel pump nozzle (not shown). However, the volume of the small chamber 8 is small, and thus the amount of fuel vapor generated by the bubbling is small. Consequently, the amount of fuel vapor escaping from the fuel inlet 4 to the outside air when the fuel filling operation is carried out is small.

As mentioned above, in the embodiments illustrated in FIGS. 1 and 2, since it is possible to reduce the amount of fuel vapor escaping to the outside air when the cap 3 is detached from the fuel inlet 4 and when the fuel filling operation is carried out, it is possible to prevent air pollution caused by the fuel vapor. In addition, there is an advantage in that the entire interior space of the fuel tank 1 can be used for storing fuel.

FIG. 5 illustrates a third embodiment. In this embodiment, a baffle member 11 made of a porous material such as a sponge is fixed to the inner bottom wall of the small chamber 8. The fuel inlet pipe 2 extends to a position near the upper face of the baffle member 11, and the fuel outlet 10 of the fuel inlet pipe 2 opposes the upper face of the baffle member 11.

Figure 6:
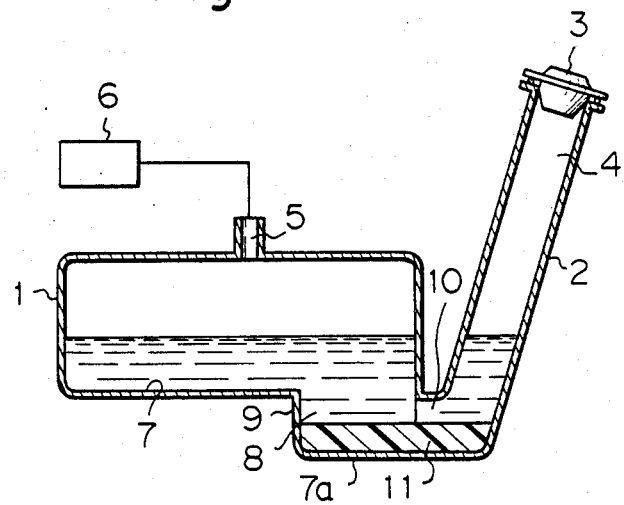

FIG. 6 illustrates a fourth embodiment. In this embodiment, the baffle member 11 extending over the entire area of the inner bottom walls of the small chamber 8 and the fuel outlet 10 is fixed to the inner bottom walls of the small chamber 8 and the fuel outlet 10.

In the embodiments illustrated in FIGS. 5 and 6, the fuel spouted from the fuel pump nozzle comes into contact with the baffle member 11, and thus bubbling is prevented by the baffle member 11. Therefore, the amount of fuel vapor generated by bubbling is reduced, and thus it is possible to reduce the amount of fuel vapor escaping to the outside air when the fuel filling operation is carried out.

While the invention has been described by reference to specific embodiments chosen for purposes of illustration, it should be apparent that numerous modifications could be made thereto by those skilled in the art without departing from the basic concept and scope of the invention. Thus, it is intended that all matter contained in the foregoing description or shown in the accompanying drawings shall be interpreted as illustrative and not in a limiting sense.

We claim:

1. A fuel tank for use in a motor vehicle, comprising:
    a bottom wall having a first planar portion and a second portion, said second portion extending downwardly from said first portion to form a chamber portion in the tank, said chamber portion having a bottom below the plane of said first portion,
    a fuel inlet pipe having an inlet with a detachable cap and an outlet end in communication with the tank, said outlet end being spaced from and open to the bottom of the chamber portion,
    a baffle of sponge-like porous material fixed in the chamber portion, said baffle including a substantially plate-like portion spaced from and transverse to the outlet end of the fuel pipe and being between said end and the chamber portion bottom for reducing the formation of fuel vapor caused by bubbling during the filling of the tank through the pipe.

2. A fuel tank according to claim 1 wherein said baffle of porous material covers substantially the entire bottom of the chamber portion.

3. A fuel tank according to claim 1 wherein the outlet end of said fuel inlet pipe terminates in the chamber portion below the plane of the first planar portion of the tank bottom wall.

4. A fuel tank according to claim 1 wherein said chamber portion has a sidewall, said fuel inlet pipe is positioned exterior of the tank and is attached to and communicates with the tank at its outlet end through said sidewall of the chamber portion.

5. A fuel tank according to claim 4 wherein the fuel inlet pipe has a lower portion attached to said outlet end and opening to the chamber portion is substantially the same plane as the bottom of the chamber portion, and said porous baffle is in an area and configuration to cover said planar lower portion of the outlet end and the chamber portion bottom.

6. A fuel tank according to claim 5 wherein the outlet end of the fuel inlet pipe is substantially rectangular in cross section.

* * * * *